(12) United States Patent
Rimon

(10) Patent No.: US 10,843,088 B2
(45) Date of Patent: *Nov. 24, 2020

(54) SHARING RECORDED GAMEPLAY

(71) Applicant: Sony Interactive Entertainment Inc., Tokyo (JP)

(72) Inventor: Noam Rimon, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 16/217,034

(22) Filed: Dec. 11, 2018

(65) Prior Publication Data
US 2019/0111347 A1     Apr. 18, 2019

Related U.S. Application Data

(63) Continuation of application No. 15/853,675, filed on Dec. 22, 2017, now Pat. No. 10,150,042, which is a (Continued)

(51) Int. Cl.
*A63F 13/86* (2014.01)
*A63F 13/497* (2014.01)
(Continued)

(52) U.S. Cl.
CPC .............. *A63F 13/86* (2014.09); *A63F 13/12* (2013.01); *A63F 13/212* (2014.09);
(Continued)

(58) Field of Classification Search
USPC ............................................. 463/32, 30, 34
See application file for complete search history.

(56) References Cited

U.S. PATENT DOCUMENTS 7,623,726 B1   11/2009   Georgiev
9,421,459 B2    8/2016   Ikeda
(Continued)

FOREIGN PATENT DOCUMENTS

CN      101601030 A    12/2009
CN      101981589 A     2/2011
(Continued)

OTHER PUBLICATIONS

XP008120577 "Semantic depth of field" Proceedings I EEE Symposium on Information Visualization 2001. INFOVIS 2001 Conf—Proceedings 2001 Information Visualization, I EEE, US, dated Oct. 22, 2001, pp. 97-104, XP008120577, DOI: 10.1109/INFVIS.2001. 963286 *section 3.3.2, 5.2; Fig. 2,4,5* (8 pages).
(Continued)

*Primary Examiner* — Pierre E Elisca
(74) *Attorney, Agent, or Firm* — Penilla IP, APC

(57) ABSTRACT

A method for sharing recorded content of an interactive application, including: recording, by a computer, a three-dimensional video clip to a storage, the three-dimensional video clip generated from a session of the interactive application; receiving, by the computer, a request to share the three-dimensional video clip over a communications network; generating, by the computer, a two-dimensional video clip by converting the three-dimensional video clip to a two-dimensional format, the two-dimensional video clip being configured for viewing through a two-dimensional display; sharing, by the computer, the two-dimensional video clip over the communications network.

18 Claims, 11 Drawing Sheets

Related U.S. Application Data continuation of application No. 15/277,894, filed on Sep. 27, 2016, now Pat. No. 9,855,504, which is a continuation of application No. 14/220,420, filed on Mar. 20, 2014, now Pat. No. 9,452,354.

(60) Provisional application No. 61/832,765, filed on Jun. 7, 2013.

(51) Int. Cl.

| | | |
|---|---|---|
| *A63F 13/87* | (2014.01) | |
| *A63F 13/30* | (2014.01) | |
| *A63F 13/355* | (2014.01) | |
| *A63F 13/212* | (2014.01) | |
| *A63F 13/213* | (2014.01) | |
| *A63F 13/25* | (2014.01) | |

(52) U.S. Cl.
CPC ............ *A63F 13/213* (2014.09); *A63F 13/25* (2014.09); *A63F 13/355* (2014.09); *A63F 13/497* (2014.09); *A63F 13/87* (2014.09); *A63F 2300/8082* (2013.01)

(56) References Cited

U.S. PATENT DOCUMENTS

| | | | |
|---|---|---|---|
| 2008/0268961 A1 | 10/2008 | Brook et al. | |
| 2009/0199275 A1* | 8/2009 | Brock ................ | G06F 3/04815 726/4 |
| 2011/0225515 A1 | 9/2011 | Goldman et al. | |
| 2011/0225519 A1 | 9/2011 | Goldman et al. | |
| 2011/0239136 A1 | 9/2011 | Goldman et al. | |
| 2011/0244954 A1* | 10/2011 | Goldman ................ | A63F 13/53 463/30 |
| 2012/0309515 A1 | 12/2012 | Chung et al. | |

FOREIGN PATENT DOCUMENTS

| | | |
|---|---|---|
| CN | 102736728 A | 10/2012 |
| CN | 102915553 A | 2/2013 |
| JP | 10-334274 | 12/1998 |
| JP | 2004-056335 | 2/2004 |
| JP | 2010-142305 | 7/2010 |
| JP | 2011-512172 | 4/2011 |
| JP | 2013-110704 A | 6/2013 |

OTHER PUBLICATIONS

Takayuki Okaya et al., Gaze-reactive display reinforcing depth by presenting DOF blur, IEICE Journal, D, Information/systems, Japan, IEICE, dated Aug. 1, 2009, J92-D(8), pp. 1298-1307.

Invitation to Pay Additional Fees and, Where Applicable, Protest Fee (PCT Article 17(3)(a) and Rule 40.1 and 40.2 (e)), issued in International Application No. PCT/US2014/041426, dated Sep. 24, 2014 (4 pages).

Notification of Transmittal of International Search Report and Written Opinion issued in International Application No. PCT/US2014/041426, dated Nov. 26, 2014 (16 total pages).

Notification of Reason(s) for Refusal issued in corresponding Japanese Patent Application No. 2016-518056, dated Jan. 10, 2016 (10 pages).

Notification of Reason(s) for Refusal issued in corresponding Japanese Patent Application No. 2016-518056, dated Aug. 15, 2017 (12 pages).

First Office Action, dated May 3, 2018, issued in related Chinese Patent Application No. 201480038691.2, with English translation (16 total pages).

First Office Action issued in related European Patent Application No. EP 14 736 536.5, dated Sep. 23, 2016 (5 pages).

Second Office Action issued in related Chinese Patent Application No. CN 201480038691.2, dated Feb. 3, 2019 (15 total pages).

Second Office Action issued in related European Patent Application No. EP 14 736 536.5, dated Apr. 2, 2019 (5 pages).

English translation of Notification of Reason(s) for Refusal issued in corresponding Japanese Patent Application No. 2018-072119, dated May 14, 2019 (4 pages).

* cited by examiner

SHARING RECORDED GAMEPLAY

CLAIM OF PRIORITY

The present application claims priority as a continuation of U.S. application Ser. No. 15/853,675 (issued as U.S. Pat. No. 10,150,042), filed Dec. 22, 2017, entitled "Sharing Three-Dimensional Gameplay," which claims priority as a continuation of U.S. application Ser. No. 15/277,894 (issued as U.S. Pat. No. 9,855,504), filed Sep. 27, 2016, entitled "Sharing Three-Dimensional Gameplay," which claims priority as a continuation of U.S. application Ser. No. 14/220,420 (issued as U.S. Pat. No. 9,452,354), filed Mar. 20, 2014, entitled Sharing Three-Dimensional Gameplay," which claims priority to U.S. Provisional Application No. 61/832,765, filed Jun. 7, 2013, entitled "Sharing Three-Dimensional Gameplay," the disclosures of which are incorporated by reference herein.

BACKGROUND

1. Field of the Invention

The present invention relates to methods and systems for sharing three-dimensional gameplay.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

To foster social interaction through video gaming, users can record video clips of their gameplay, to share with their friends. When a user plays a video game using an HMD, the HMD can provide a very immersive experience during gameplay. However, a video clip of the user's gameplay that is viewed by another person might not be presented on hardware that is capable of replicating the original gameplay experience. Instead, the video clip might be presented in a much less immersive context, such as within an embedded video player on a website. Thus, there can be a mismatch between the original gameplay presentation and the presentation of the recorded gameplay video clip. Because of this mismatch, a recorded video clip of a user's gameplay may not provide an optimal viewing experience for the viewer.

It is in this context that embodiments of the invention arise.

SUMMARY

Embodiments of the present invention provide methods and systems for sharing three-dimensional gameplay of a video game. It should be appreciated that the present invention can be implemented in numerous ways, such as a process, an apparatus, a system, a device or a method on a computer readable medium. Several inventive embodiments of the present invention are described below.

In one embodiment, a method for sharing three-dimensional gameplay of a video game to a social network is provided, the method including: receiving a request to share a recorded gameplay portion to a social network, the recorded gameplay portion defined by three-dimensional recorded video; generating a two-dimensional video clip based on the three-dimensional recorded video; sharing the two-dimensional video clip to the social network; wherein the method is executed by a processor.

In one embodiment, receiving the request is defined from an active gameplay session of a user.

In one embodiment, receiving the request is defined from a button press on a controller device.

In one embodiment, generating the two-dimensional video clip includes analyzing gameplay activity occurring during the recorded gameplay portion to determine a focal depth at which to define a frame of the two-dimensional video clip.

In one embodiment, generating the two-dimensional video clip includes analyzing gameplay activity occurring during the recorded gameplay portion to determine a depth of field according to which to define a frame of the two-dimensional video clip.

In one embodiment, sharing the two-dimensional video clip to the social network includes generating a post to a social graph associated with a user of the social network, the post defined to include the two-dimensional video.

In another embodiment, a method for viewing a three-dimensional gameplay video clip is provided, including: receiving a request to play a gameplay video clip, the gameplay video clip defined in a three-dimensional format; activating a plugin to convert the gameplay video clip from the three-dimensional format to a two-dimensional format; presenting the converted gameplay video clip; wherein the method is executed by a processor.

In one embodiment, receiving the request is defined from an interface of a social network.

In one embodiment, the interface of the social network defines one or more posts to the social network.

In one embodiment, the plugin is configured to detect a hardware configuration of a device on which the plugin is executed.

In one embodiment, converting the gameplay video clip from the three-dimensional format to a two-dimensional format includes analyzing recorded gameplay data.

In one embodiment, the recorded gameplay data includes one or more of game state data, input data, motion data, or gaze direction data.

In another embodiment, a method for converting a recorded gameplay video clip from a three-dimensional format to a two-dimensional format is provided, including: analyzing recorded gameplay data from a gameplay session from which the recorded gameplay video clip was generated; converting the recorded gameplay video clip from the three-dimensional format to a two-dimensional format based on the recorded gameplay data; wherein the method is executed by a processor.

In one embodiment, the gameplay data includes game state data.

In one embodiment, the gameplay data includes one or more of input data or motion data.

In one embodiment, the gameplay data includes gaze direction data defining a gaze direction of a user's eyes during the gameplay session.

In one embodiment, analyzing the recorded gameplay data includes identifying a focal depth from a three-dimensional space defined by the recorded gameplay video clip.

In one embodiment, analyzing the recorded gameplay data includes identifying a depth of field for the identified focal depth.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for sharing three-dimensional gameplay of a video game.

It will be obvious, however, to one skilled in the art, that the present invention may be practiced without some or all of these specific details. In other instances, well known process operations have not been described in detail in order not to unnecessarily obscure the present invention.

Figure 1:
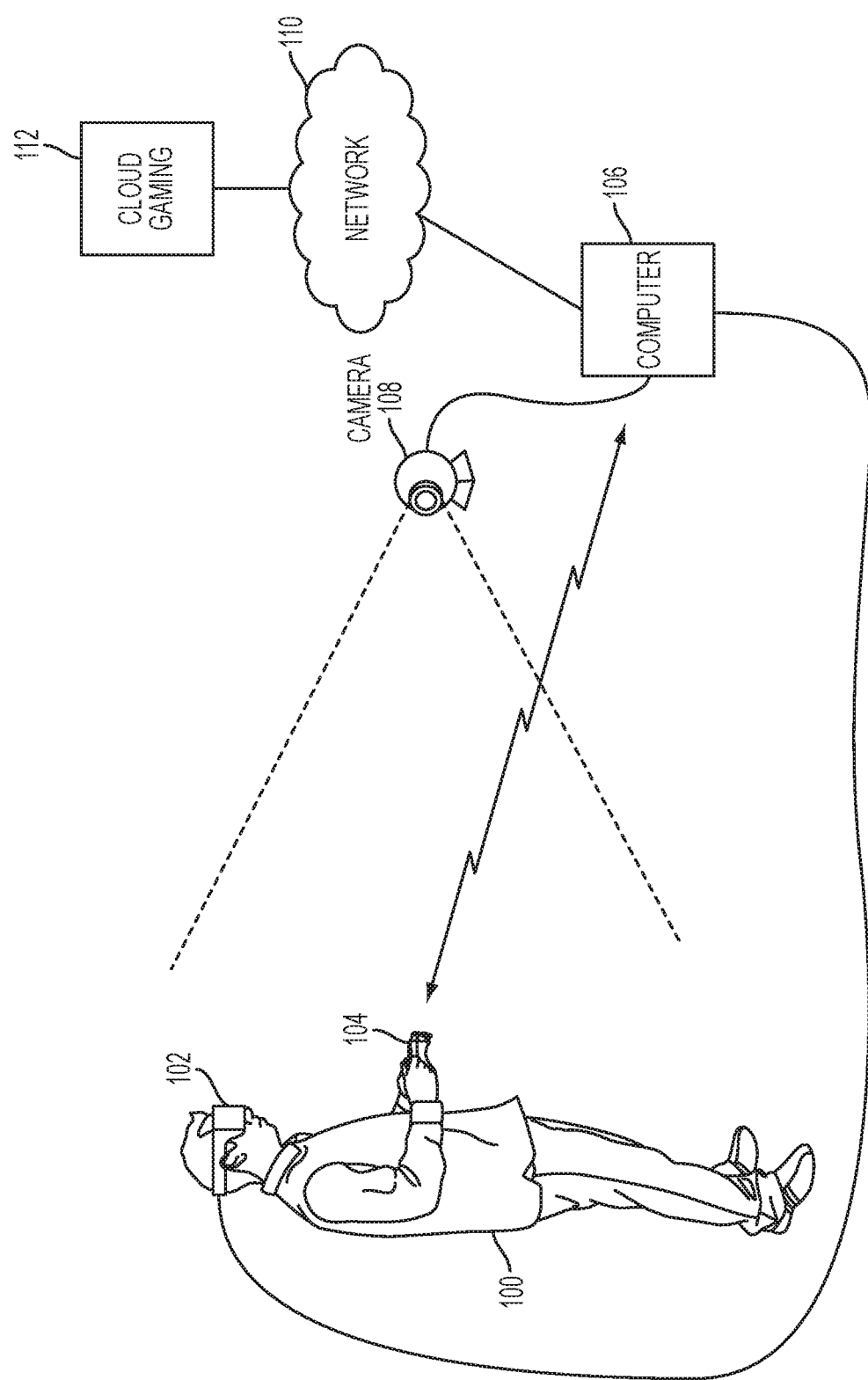
FIG. 1 illustrates a system for interactive gameplay of a video game, in accordance with an embodiment of the invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light which can be tracked to determine its location and orientation. Additionally, as described in further detail below, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless.

Figure 2:
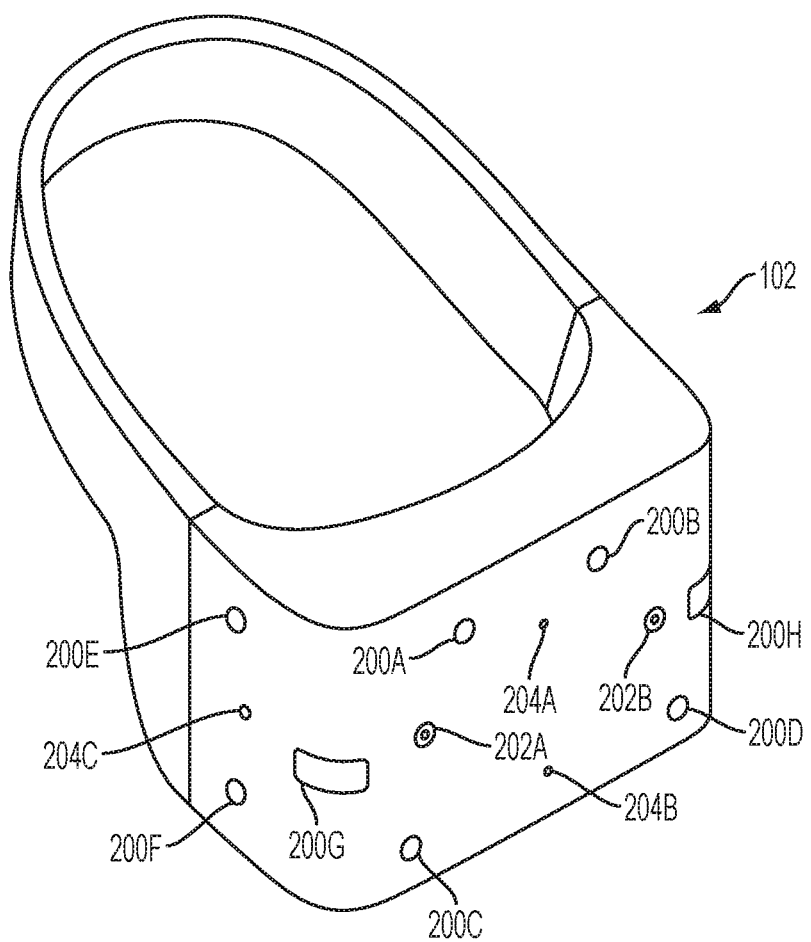
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
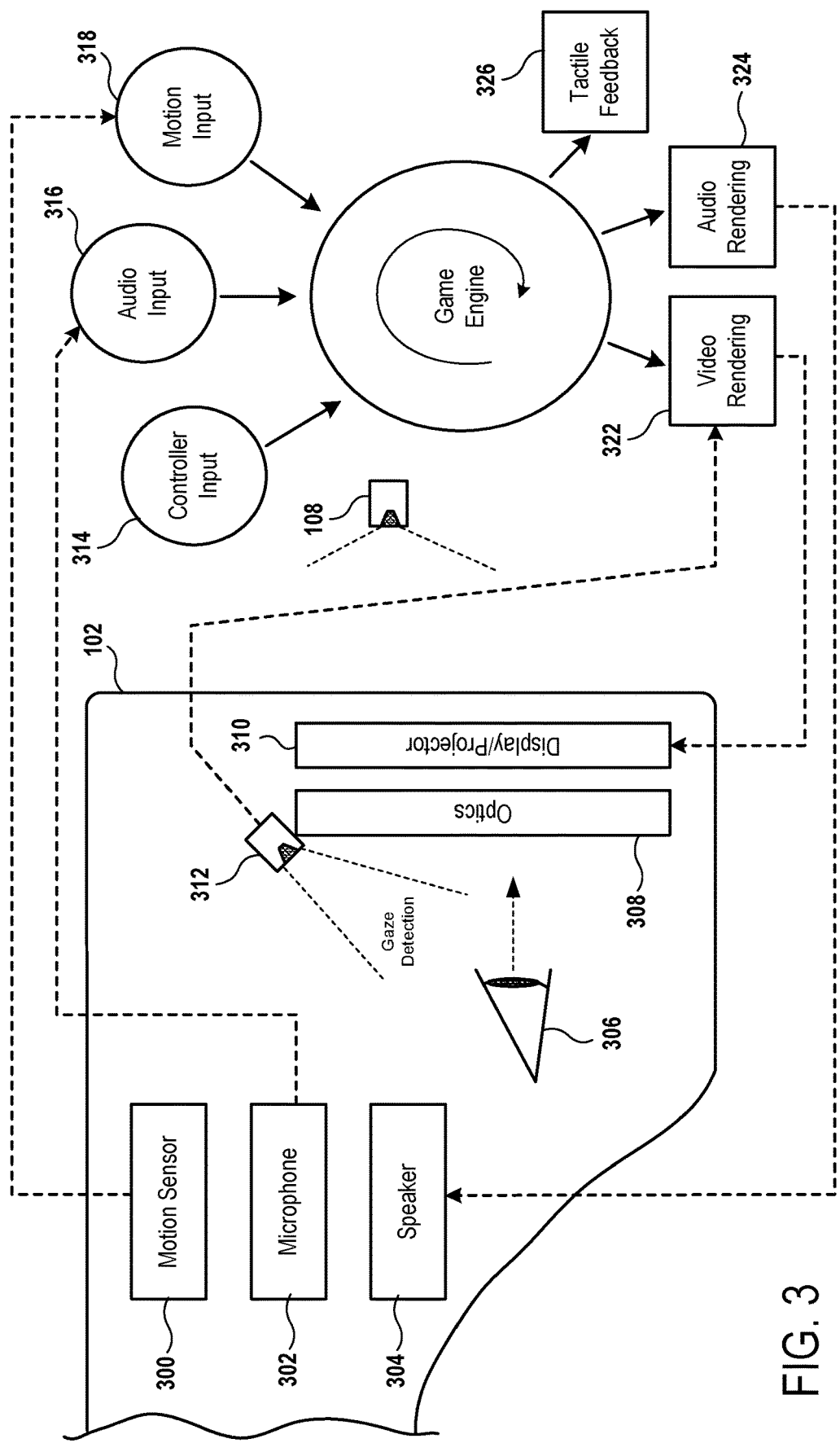
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as controller 104. By way of example, controller input 314 may include directional inputs, button presses, trigger activation, movements, or other kinds of inputs processed from the operation of a gaming controller. The audio input 316 can be processed from a microphone 302 of the HMD 102, or from a microphone included in the image capture device 108. The motion input 218 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking a specific direction, then the video rendering for that direction can be prioritized or emphasized, such as by providing greater detail or faster updates in the region where the user is looking.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

Figure 4:
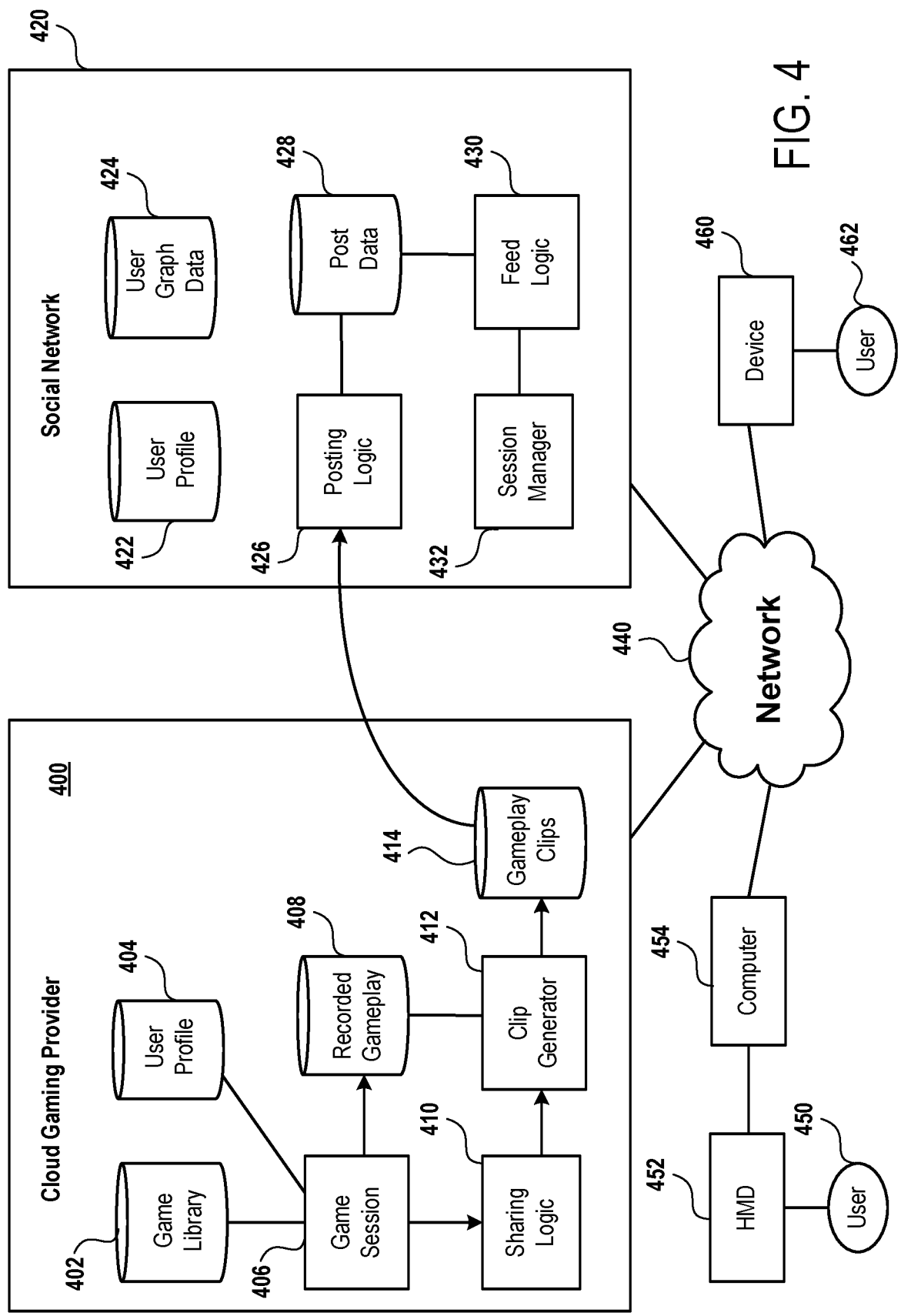
FIG. 4 illustrates a system for generating and sharing a recorded gameplay video clip to a social network, in accordance with an embodiment of the invention.

FIG. 4 illustrates a system for generating and sharing a recorded gameplay video clip to a social network, in accordance with an embodiment of the invention. The user 450 is shown to be utilizing a HMD 452, which is in communication with a computer 454. The computer 454 communicates over a network 440 with cloud gaming provider 400. The cloud gaming provider 400 defines a game library 402 which contains a plurality of game titles which may be played by users accessing the cloud gaming provider's streaming gaming services. A user profile storage 404 stores user profiles associated with specific users of the cloud gaming service. In one embodiment, a game session 406 is defined by the cloud gaming provider. The game session 406 can define the active game engine of a video game as it is being played by the user 450. As the game session 406 progresses, gameplay is recorded and stored in a recorded gameplay storage 408. The recorded gameplay can include recorded video and audio that is presented to the user, as well as recorded inputs, events, parameters, or other game state data occurring during the gameplay of the video game.

Sharing logic 410 is defined for sharing a video clip of the user's gameplay to a social network. The sharing logic 410 may be configured to activate a clip generator 412. The clip generator 412 may present an interface to the user for selecting a portion of gameplay from which to generate the video clip, and perform generation and storage of the video clip to a gameplay clips storage 414. It will be appreciated that the clip generator may generate the video clip based on recorded gameplay video in conjunction with other recorded gameplay data, such as game inputs, gaze direction data of the user, and various game state data of the video game.

The sharing logic 410 is configured to share the gameplay video clip to a social network 420. As shown in the illustrated embodiment, the social network includes user profile data 422, including users' settings, preferences, personal data, etc. Additionally, user graph data 424 includes data defining the social graphs of the various users of the social network. Broadly speaking, this data defines the connections between users of the social network.

In one embodiment, the social network includes posting logic 426 for generating a post to the social network. In one embodiment, the posting logic 426 can be accessed through an API of the social network. The posting logic 426 may be activated by sharing logic 410 of the cloud gaming provider 400, so as to facilitate sharing of the video clip generated and stored by the cloud gaming provider 400 to the social network 420. The posting logic 426 of the social network 420 can be configured to define a post to the social network. Data defining the post can be stored to a post data storage 428. The data defining a given post can include text, references to networked resources (e.g. a hyperlink or url, reference to the gameplay video clip), as well as various kinds of media content, such as images, audio, and video content (e.g. the gameplay video clip).

A session manager 432 is configured to manage a session on the social network by a user 462, who accesses the social network through a device 460. It should be appreciated that the device 460 can be any computing device configured to provide access to the social network, and may do so via applications, such as a web browser or a dedicated application or app. The user's 462 session may be defined to provide a feed of posts to the social network, which may include posts by users in a social graph of the user 462, as defined by the user graph data 424. To this end, feed logic 430 is configured to generate a feed of posts which are specific to the user 462 and prioritized in accordance with various features, such as membership in the user's 462 social graph or a subgroup of the social graph, the user's preferences, history of activity on the social network, recency of the post or any comments to the post, etc.

Accordingly, in one embodiment, the user 450 who has generated a video clip of his gameplay is also a member of the social graph of the user 462 on the social network. The user 450 is able to share the gameplay video clip to the social network as part of a post on the social network. The newly created post will appear in the feed that is generated for the user 462 when accessing the social network. In this manner, the user 462 is able to view and share in the experience of the user 450's gameplay of the video game.

Though in the illustrated embodiment, a cloud gaming provider is described as defining the functionality for generating and sharing a gameplay video clip to a social network, it should be appreciated that in other embodiments, such functionality can be defined on the computer 454, or the HMD 452, or on any other device or devices connected to network 440 and so configured to perform the functionality for video clip generation and sharing thus described.

Additionally, the gameplay of the video game as it is presented on the HMD 452 can be defined by three-dimensional (3-D) video content. However, users accessing the social network may not have the ability to properly view 3-D video content. Hence, in one embodiment, the clip generator 412 is configured to convert 3-D recorded gameplay video to a two-dimensional (2-D) video format. The 2-D video content can be more easily shared with others on the social network.

It should be appreciated that social network 420 may be any social network known in the art. The social network can be provided by a separate provider or entity than that which facilitates the gameplay of the video game and video clip generation. In another embodiment, the social network is a gaming specific social network provided by the cloud gaming provider or a provider that facilitates the gameplay of the video game.

Figure 5A:
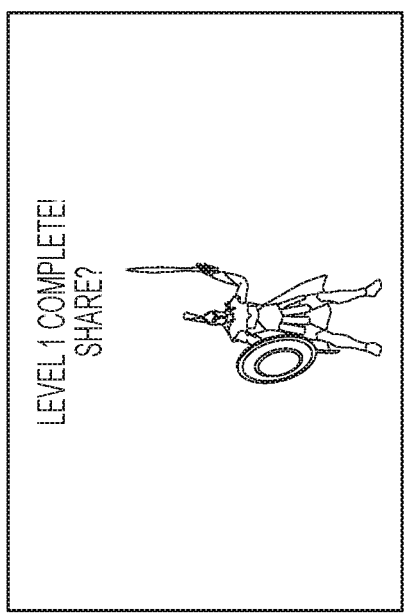
FIGS. 5A, 5B, 5C, and 5D illustrate various views presented to a user to enable creation of a gameplay video clip and sharing of the gameplay video clip to a social network, in accordance with an embodiment of the invention.
Figure 5B:
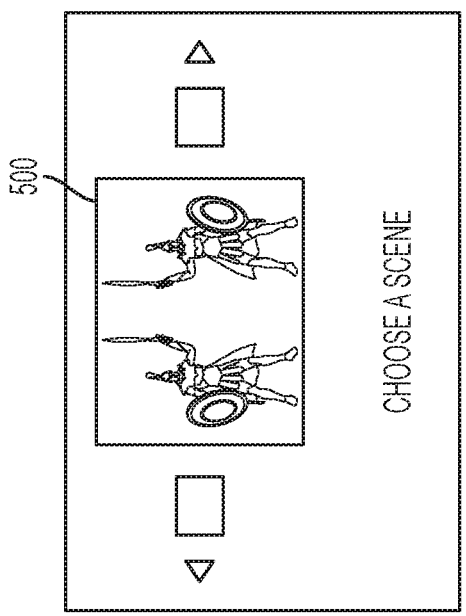

FIGS. 5A, 5B, 5C, and 5D illustrate various views presented to a user to enable creation of a gameplay video clip and sharing of the gameplay video clip to a social network, in accordance with an embodiment of the invention. At FIG. 5A, the user has just completed a level of gameplay in a video game. Upon completion of the level of gameplay, the user is presented with an option to share video from the user's gameplay with other users of a social network. When the user opts to share gameplay video, then as shown at FIG. 5B, an interface for selecting a scene from the user's recorded gameplay video is presented. Each scene is an identified portion of the user's recorded gameplay video. In the illustrated embodiment, a specific scene 500 is highlighted in the view.

It will be appreciated that scenes may be predefined for the user to choose amongst, based on various aspects of the video game and the user's gameplay. For example, a video game with a linear storyline may have defined sections (temporal and/or geographic) through which the user must progress in a linear fashion. Predefined scenes can be generated based on such sections. In other embodiments, predefined scenes can be generated based on other facets of the user's gameplay, such as the achievement of significant events or goals in the video game, regions of intense gameplay, etc.

Figure 5C:
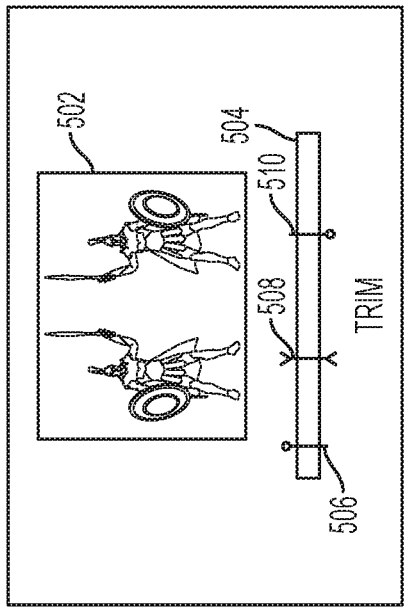

After a predefined scene is selected, then as shown at FIG. 5C, an interface for trimming the video of the predefined scene is provided. By way of example, a slider bar 504 indicating the length of the predefined scene is illustrated, with sliders 506 and 510 being moveable along the slider bar 504 to indicate a desired start and end point, respectively, for the gameplay video clip to be generated. The a representative image frame from the video may be selected by moving a slider 508. A preview of the video clip or representative image can be displayed in the region 502 of the interface.

Figure 5D:
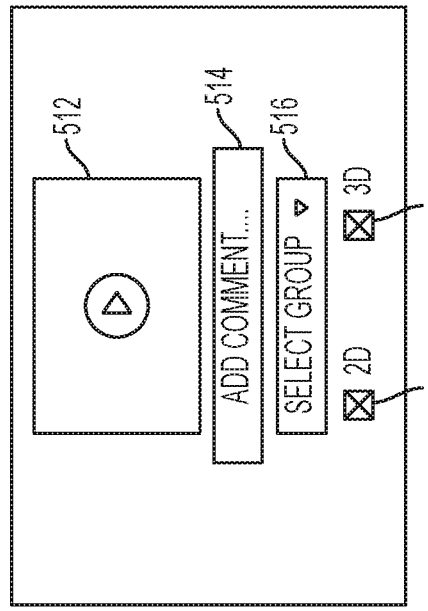

After trimming of the predefined scene is performed, the gameplay video clip can be defined and prepared for sharing. A sharing interface shown at FIG. 5D is presented. In the sharing interface, a preview of the video clip is shown at reference 512. A comments field 514 is provided for the user to enter text comments to accompany the shared video clip. A menu 516 is provided to enable the user to select a specific group of users or friends with whom to share the video clip. Additionally, checkboxes 512 and 520 indicate options for sharing the video clip in 2-D or 3-D.

In one embodiment, the recorded gameplay video is defined by 3-D video content. Therefore, if a user opts to share the selected video clip in 2-D, then a conversion process is performed to convert the 3-D video content to 2-D video content to define the gameplay video clip. The converse may also occur, wherein the recorded gameplay video is defined by 2-D video content, and accordingly converted to 3-D video content as requested by the user.

Figure 6:
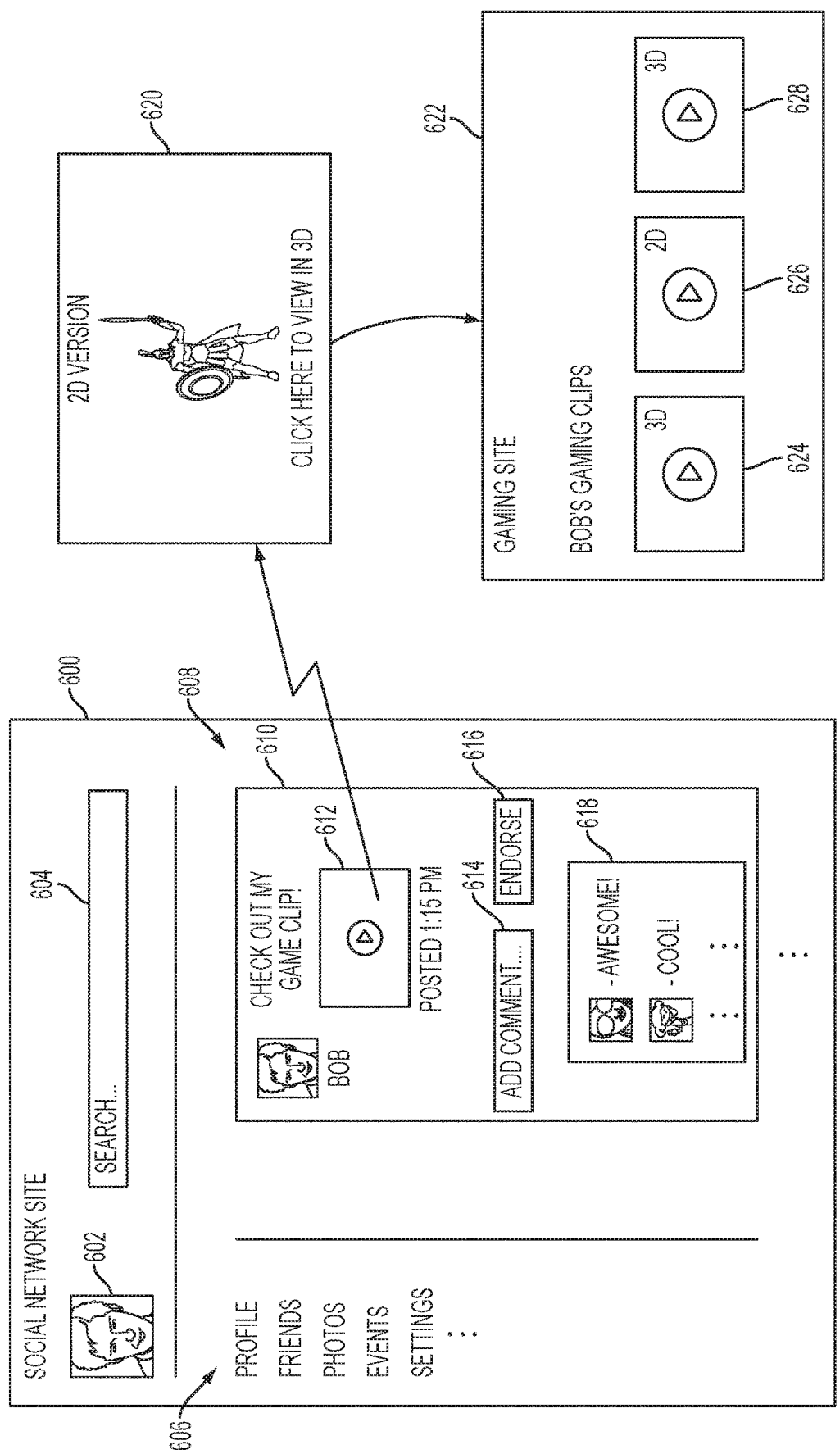
FIG. 6 illustrates a view of a social network site, in accordance with an embodiment of the invention.

FIG. 6 illustrates a view of a social network site 600, in accordance with an embodiment of the invention. The social network site 600 includes, by way of example, a profile picture 602 of the current user, a search field 604 for entering text to search on the social network, and various options 606 to access specific features of the social network, such as the user's profile, a list of the user's friends, photos/videos (e.g. posted or stored by the user, shared with the user, in which the user is tagged, etc.), events, settings, etc.

The social network site 600 further includes a feed section 608, in which posts which have been shared on the social network are prioritized and displayed to the user. In the illustrated embodiment, a post 610 is shown to include a gameplay video clip 612. The gameplay video clip 612 is accompanied by text and other information such as the profile picture and name of the user who generated the post ("Bob"), the time the video clip was posted to the social network, and comments 618 in response to the post 610. A comments field 614 is provided for the current user to enter a comment in response to the post, and an endorsement button 616 is provided for the user to indicate endorsement of the post on the social network.

In one embodiment, the video clip 612 is a 2-D video clip that has been converted from a 3-D source video. Thus, when playback of the video clip 612 is activated, the 2-D presentation is displayed, as indicated at reference 620. In one embodiment, the video clip 612 can be configured to provide access to the 3-D version of the gameplay video, such as via an embedded link/reference to the 3-D version or to another site where the corresponding 3-D video clip is hosted. In the illustrated embodiment, presentation 620 of the 2-D video clip 612 includes an embedded link, which when activated redirects the user to a gaming site 622 on which clips including the 3-D version of video clip 612 are available for viewing. In the illustrated embodiment, 3-D video clip 624 is the 3-D version of the 2-D video clip 612, and is accessible at the gaming site 622 along with additional video clips 626 and 628 from the same user ("Bob").

Figure 7:
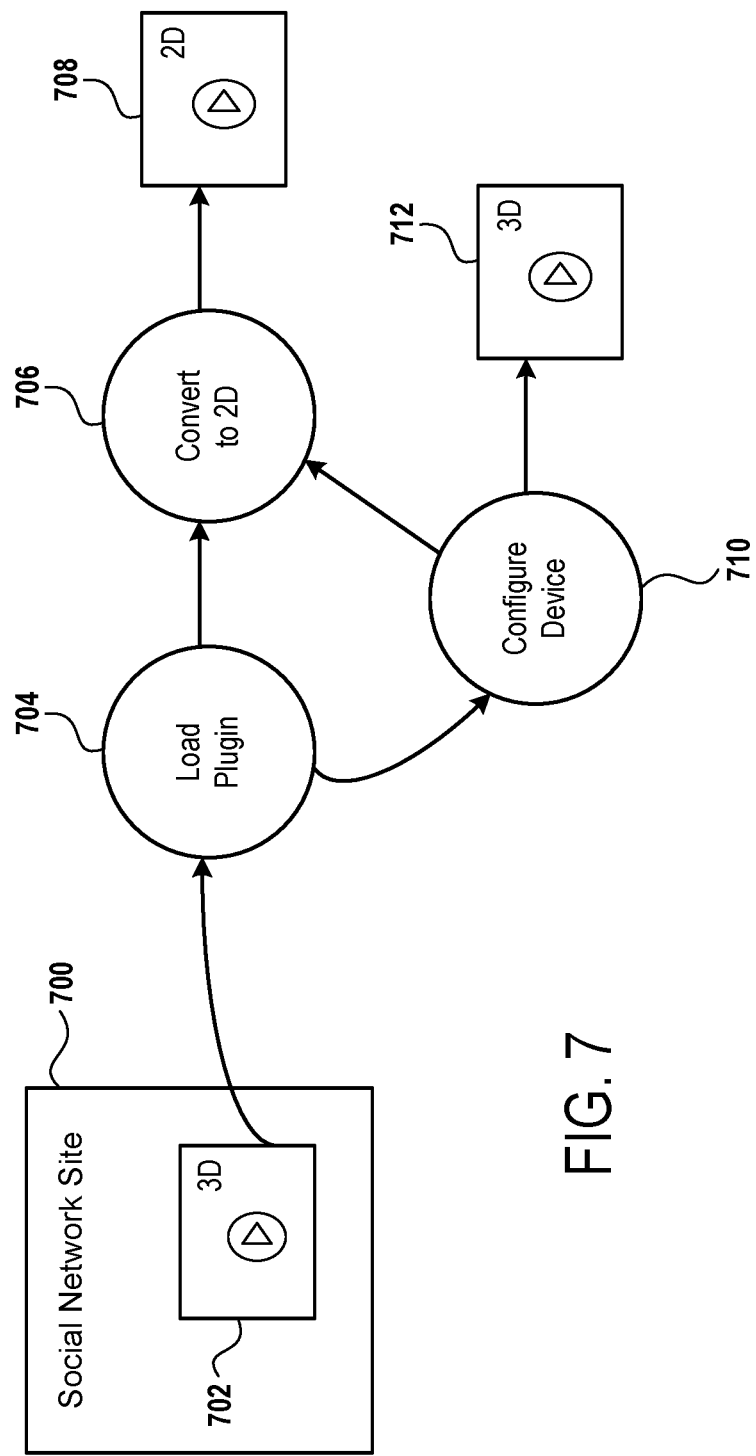
FIG. 7 illustrates sharing of a 3-D gameplay video clip on a social network site, in accordance with an embodiment of the invention.

FIG. 7 illustrates sharing of a 3-D gameplay video clip on a social network site, in accordance with an embodiment of the invention. In the illustrated embodiment, a 3-D gameplay video clip 702 has been shared on the social network site 700. The 3-D gameplay video clip 702 may be defined according to a non-native encoding scheme, that may not be natively playable by a given device or application, such as a web browser. Furthermore, a given device on which the 3-D video is available, may not support 3-D playback. Therefore, in one embodiment, a plugin can be loaded to facilitate playback of the 3-D video clip, as indicated at reference 704. The plugin may define a codec or other decoding scheme to enable playback of the 3-D video clip on the user's device.

In one embodiment, the plugin can be configured to convert the 3-D video clip 702 to a 2-D format, as indicated at reference 706, resulting in playback of a 2-D video clip 708. It should be appreciated that the conversion to 2-D video content can take place in real-time as the video is being watched, with an appropriate buffering as is known in the art. Or the conversion can be performed, in part or in whole, in advance of initiating playback of the 2-D video 708.

In another embodiment, the plugin can be configured to identify the user's device through which the user is accessing the 3-D video clip. The identification of the user's device can be automatic based on hardware detection which identifies the device, or can be manually entered by the user. If it is determined that the user's device supports 3-D playback, then the 3-D video clip can be presented in 3-D, as indicated at reference 712. For example, original user's gameplay may have been presented on a HMD, and the device on which the video clip is accessed may be another HMD, and thus the user accessing the video clip may view and experience the 3-D gameplay video in a similar manner to that experienced by the original user during gameplay. If the device is identified as not supporting 3-D playback, then the 3-D video is converted to 2-D as indicated above for playback on the user's device.

In another embodiment, the 3-D video clip 702 may be defined according to a 3-D format that differs from that of the original 3-D format in which the gameplay was presented to the original user whose gameplay was recorded. For example, the original user may have played the video game via an HMD with 3-D video recorded in a first 3-D format specific for the HMD. To facilitate broader sharing, the recorded gameplay video may be converted to a second 3-D format, and the video clip shared in this second 3-D format. However, another user may access the video clip from another HMD supporting the first 3-D format, and therefore the video clip can be reconverted from the second 3-D format back to the first 3-D format for viewing on the HMD of the user accessing the video clip.

Figure 8:
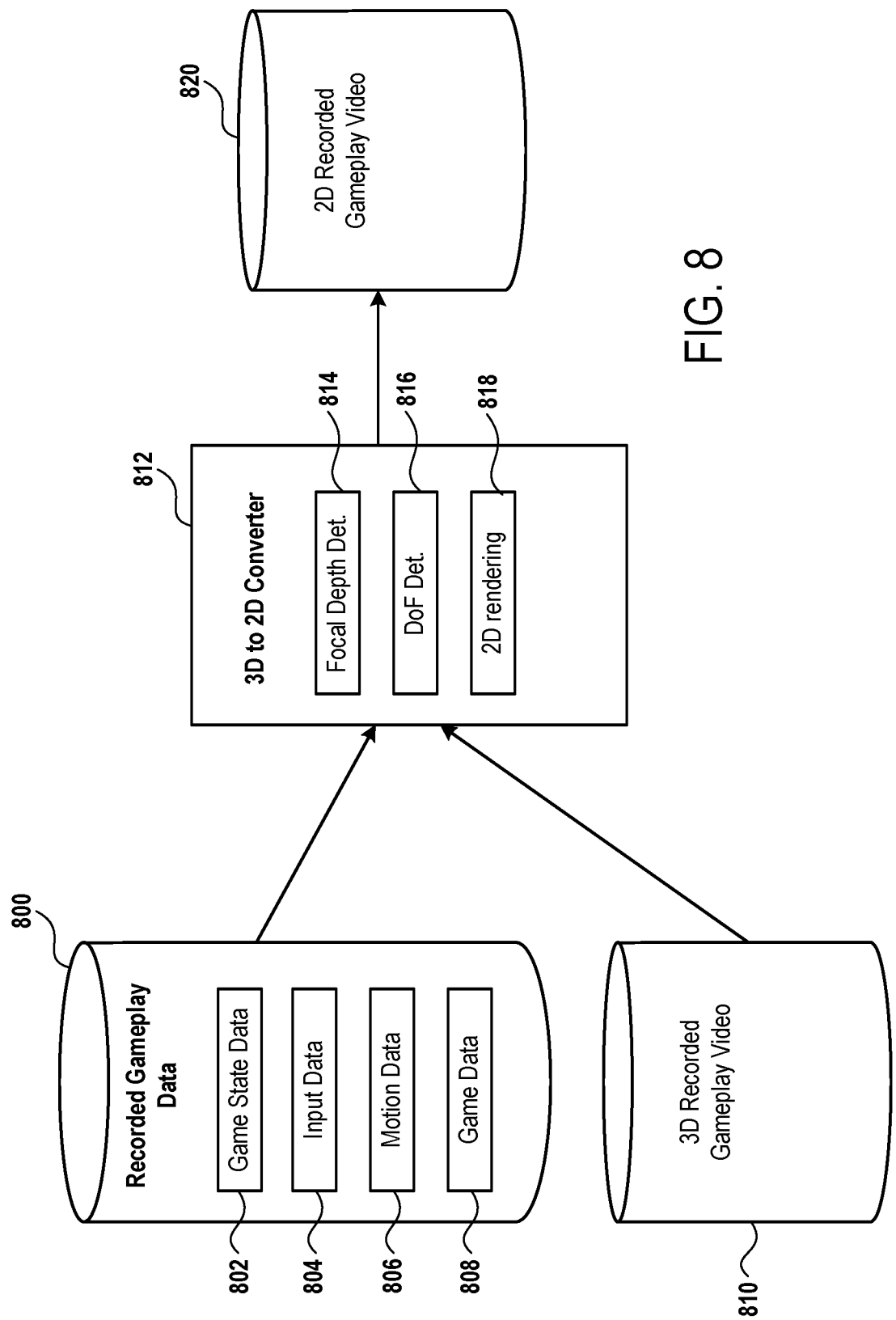
FIG. 8 illustrates a system for converting a 3-D gameplay video clip to a 2-D gameplay video clip, in accordance with an embodiment of the invention.

FIG. 8 illustrates a system for converting a 3-D gameplay video clip to a 2-D gameplay video clip, in accordance with an embodiment of the invention. As shown, a recorded gameplay data storage 800 stores various data from a gameplay of a video game. By way of example, the gameplay data can include game state data 802, input data 804, motion data 806, and gaze data 808. The game state data 802 includes data defining the game state of the video game during the course of the user's gameplay, including values of variables and other parameters which define the game state. The input data 804 can include data describing user-generated inputs which were supplied during gameplay. The motion data 806 can include data describing movements of various hardware, such as a HMD or controller, as well movements of the user or other tracked objects. The gaze data 808 can include data defining the gaze direction of the user's eyes during gameplay.

A 3-D recorded gameplay video storage 810 stores 3-D recorded gameplay video of the user's gameplay. The 3-D recorded gameplay video can be defined in discrete clips or segments for sharing. A 3-D to 2-D converter 812 is provided for converting 3-D recorded gameplay video to a 2-D format. The conversion to 2-D may be based in part on the recorded gameplay data as defined above. In one embodiment, a focal depth determination module 814 determines a focal depth within a 3-D space defined by the 3-D recorded gameplay video at which to define one or more frames of 2-D video content. A depth of field determination module 816 is configured to determine the depth of field characteristics associated with the focal depth for the one or more frames of the 2-D video content. It should be appreciated that the focal depth and depth of field characteristics can be based on the various recorded gameplay data.

For example, when it is determined based on the gaze direction data and game state data that the user was looking at an object situated at a given focal depth, the focal depth for the 2-D video conversion can be set to the focal depth of the object. Depending upon the nature of the scene, the depth of field can be determined to be more shallow, so as to provide a cinematic effect that may draw the attention of the viewer to objects in focus at or near the given focal depth, or the depth of field may be determined to be wider, to enable the viewer to see and comprehend more of the scene in focus. It should be appreciated that the focal depth and the depth of field can be determined based on a variety of considerations as determined based on analysis of the recorded gameplay data.

A 2-D rendering module 818 renders the 2-D video data by applying the selected focal depth and depth of field to the 3-D recorded video to render 2-D recorded video that is stored in a 2-D recorded gameplay video storage 820.

Figure 9:
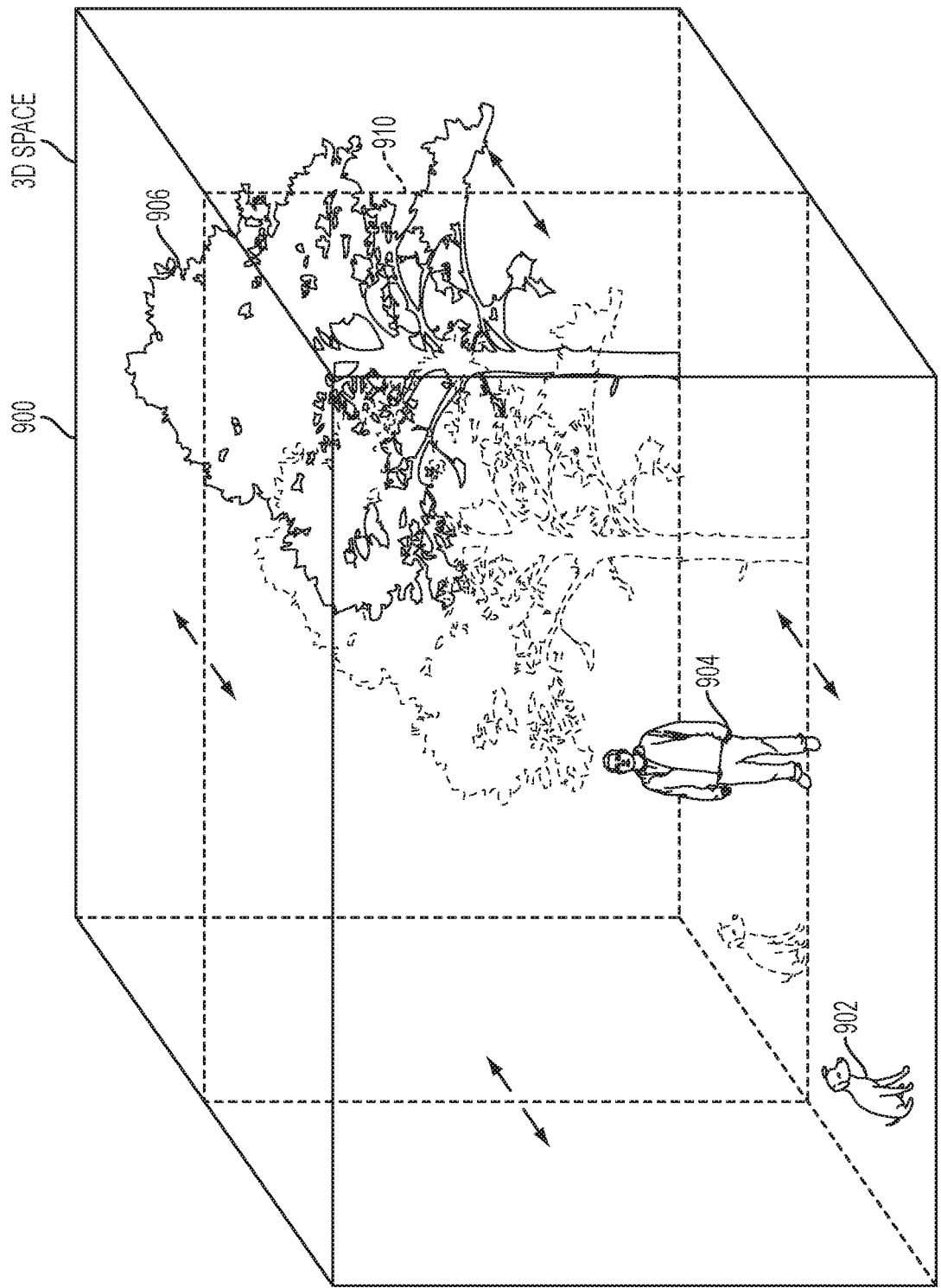
FIG. 9 illustrates a 3-D image, from which a 2-D image is generated, in accordance with an embodiment of the invention.

FIG. 9 illustrates a 3-D image, from which a 2-D image is generated, in accordance with an embodiment of the invention. The 3-D image 900 defines a 3-D space in which various objects, such as a dog 902, a character 904, and a tree 906 are shown. A focal depth 910 is conceptually defined by a plane at a certain depth within the 3-D space. Depending upon the chosen depth of field for conversion to 2-D, objects fore and aft of the character 904 may or may not be in focus. For example if a shallow depth of field is chosen then the person 904 may be in focus, whereas the dog 902 and/or the tree 906 may not be in focus. While if a wide depth of field is chosen, then the dog 902 and the tree 906 may both be in focus along with the person 904.

It will be appreciated that in accordance with various embodiments described herein, the generation of a recorded gameplay video clip can be optimized based on data collected during the original gameplay. When a gameplay video is generated without consideration of such data, the video may not be appropriate to the context in which the video will be viewed, resulting in a sub-optimal viewing experience for the viewer. This effect may be even more pronounced when the original gameplay was presented on an HMD device, as the HMD device is capable of providing a very immersive experience that may be very different from the context in which the gameplay video will be viewed (e.g. on a cell phone, tablet, laptop, PC display, etc.). Because there may be a large difference in the capabilities of the hardware utilized for the original gameplay presentation versus that utilized for viewing of the recorded gameplay video, it is useful to consider various gameplay-related data when generating the recorded gameplay video.

In some embodiments, gaze tracking information which was recorded during gameplay can be applied to optimize the gameplay video clip. For example, specific regions of the gameplay video which the player was viewing during gameplay may be identified based on the gaze tracking information. Such regions can be encoded with greater fidelity (e.g. increased resolution, detail, refresh rate) than other regions which the user was not directly viewing. In one embodiment, specific objects within a virtual environment may be identified from the gaze tracking information as objects which the player was viewing during gameplay, and these objects may be rendered with greater fidelity in the gameplay video clip. It will be appreciated that various object rendering parameters known in the field of computer graphics and animation can be adjusted to increase the overall appearance of such objects versus other objects which the user was not specifically viewing during gameplay.

In another embodiment, the number of objects rendered for a given region of the virtual environment is potentially adjusted based on gaze tracking information. For example, in one embodiment, in regions where the player was looking, a maximum allowable number of objects for rendering in the gameplay video clip is greater than in regions where the player was not looking. It should be appreciated that there may be different classes/types of objects defined within the video game, and maximum allowable numbers may be defined for each class/type of object and adjusted based on gaze tracking information for purposes of generating a gameplay video clip.

In this manner, the gameplay video is optimized so that objects or regions which the player was viewing are presented in the gameplay video with increased graphical fidelity and emphasis, thereby highlighting to the viewer those areas which the player was viewing during gameplay.

Furthermore, in additional embodiments, the focus and depth of field can be adjusted based on gaze tracking information. It will be appreciated that a player's gaze direction may be tracked based on detection of the orientation/positioning of the player's eyes within the HMD device, in combination with detection of the orientation/positioning of the HMD device itself. The movements of the HMD device will correlate to movements of the player's head, and the relative positioning of the player's eyes in combination with the HMD device's position/orientation can be utilized to determine the gaze direction of the player in physical space. This gaze direction can be utilized during gameplay of a video game to provide appropriate views to the player of a virtual environment of the video game. For example, as the player moves his/her head and/or eyes so as to gaze in various directions, the view provided on the HMD device can provide the effect of looking about the virtual environment in a natural manner, as if the player were situated within the virtual environment. It will be appreciated that the movement of the HMD device can be detected in various ways, such as by detection from inertial sensors (e.g. accelerometers, gyroscopes, magnetometers) included within the HMD device, or by externally tracking the HMD device (e.g. tracking illuminated features on the HMD device through image capture and recognition).

In embodiments described herein, HMD device data, such as data regarding movement of the HMD device, can be utilized to impact the generation of a gameplay video clip. It should be appreciated that data describing movement of the HMD device can be utilized alone or in combination with other types of data to alter aspects of the gameplay video.

In some embodiments, objects which the player is determined to have viewed during gameplay may appear in focus, or the focal length may be adjusted so that such objects appear in focus, within the gameplay video clip. The resulting effect will be such that various objects which the player has viewed come into focus during the course of the gameplay video. Furthermore, the depth of field may be adjusted based on gaze tracking information. For example, in one embodiment, if the player looks at a given object for an extended period of time, then the depth of field can be decreased while maintaining the given object in focus. This can result in blurring of other objects (e.g. background and foreground objects), so that in the resulting gameplay video clip, emphasis is placed on the given object that the player viewed for the extended period of time. In one embodiment, the decrease in depth of field may be applied when the player's gaze upon the given object exceeds a threshold time period. In another embodiment, a rate of change of the depth of field can be defined to increase over time as the player's gaze at the given object is maintained, until a minimum depth of field is reached. The result is that when the player continues to look at an object, the depth of field decreases slowly at first, and then accelerates to decrease at a faster rate as time progresses, and eventually ceases to change when the minimum depth of field is reached.

When a player is experiencing a video game through an HMD device, the display of the HMD device may occupy a very large portion of the player's field of vision. However, when a viewer views a video clip of the player's gameplay, the viewer may be watching the video clip on a device which occupies a much smaller portion of the user's field of vision, such as a mobile device, a television, or a personal computer display. It should be appreciated that for purposes of the present disclosure, the player's "field of vision" is to be distinguished from the player's "field of view." The player's field of vision is the physical area which the player's eyes are capable of comprehending, including the player's central gaze area and peripheral vision area. Humans typically have a maximum horizontal field of vision range of nearly 180 degrees (and typical vertical range of 135 degrees). On the other hand, the player's field of view is defined by that portion of a virtual environment that is presented to the player during gameplay. Thus, the field of view presented to the player can be any amount up to 360 degrees in a given direction (e.g. horizontal or vertical).

Thus, the portion of the player's field of vision that is occupied by the HMD device's display during gameplay may be much greater than the portion of the viewer's field of vision that is occupied by the viewer's device on which the recorded gameplay video is rendered. As such, the field of view of the virtual environment of the video game that was provided through the HMD device during gameplay may not be appropriate for the viewer. Therefore, in some embodiments, the field of view that is presented in the video clip can be adjusted to be different from that which was presented to the player during the original gameplay. For example, in one embodiment, the field of view presented in the video clip is set at a lower amount than that which was presented during the original gameplay. Furthermore, the direction of the field of view presented in the video clip can be determined based on gaze tracking information, so as to track the player's viewing direction during gameplay and ensure presentation of regions that the player viewed during gameplay.

In other embodiments, the field of view presented in the gameplay video clip is adjusted based on gameplay data. For example, in one embodiment, the field of view of the video clip is increased when it is determined that the player's gaze exhibits a high amount of movement. Conversely, the field of view of the video clip is decreased when it is determined that the player's gaze exhibits a low amount of movement. The resulting effect is that the presentation of the virtual environment in the video clip is zoomed out when movement of the player's gaze direction increases, and zoomed in when movement of the player's gaze direction decreases. By zooming out when movement of the player's gaze direction increases, the gameplay video clip can appear less jittery during periods of high movement by the player, and therefore provide a smoother viewing experience for the viewer.

It should be appreciated that movement of the player's view direction can be defined and quantified in various ways. For example, movement can be defined based on the rate of change in direction, the magnitude of change in direction, the length of time over which movements of a given rate or magnitude occur, etc. It should be appreciated that the correlation between movement and zoom can be defined in various ways. For example, in one embodiment, when the movement of the player's view direction exceeds a predefined threshold, then the field of view is adjusted to zoom out. Conversely, the field of view may be adjusted to zoom in when the movement falls below a predefined threshold. The concepts can be combined to provide for a default level of zoom, which may be adjusted to zoom out or zoom in depending upon whether the level of movement by the player exceeds a first threshold or falls below a second threshold, respectively.

Additionally, it is noted that because movement data of the player is captured during the player's gameplay, it is not necessary to analyze recorded gameplay video to identify portions of it that are jittery. Rather, the movement data of the player can be analyzed to identify periods of high or low movement by the player. As noted above, the movement data can include data regarding the position/orientation and movement of the HMD device during gameplay, as well as data regarding the position/orientation and movement of the player's eyes during gameplay.

In another embodiment, not only the field of view or zoom can be adjusted in response to the level of movement by the player, but also the location of the point of view in the virtual environment from which video is generated for the gameplay video clip can be moved. For example, during periods of high movement by the player, then the point of view from which the video is generated may be shifted backward and/or upward from that applied during actual gameplay. It will be appreciated that by shifting the point of view away from that applied during gameplay (which was presented to the player), the point of view may in some instances change from a first-person point of view to a third-person point of view. Additionally, it is noted that changes in the location of the point of view can be applied in combination with changes in the field of view, based on levels of view direction movement by the player during gameplay.

Still further, changes in field of view/zoom, point of view, focus, depth of field, or other video parameters (as applied for the gameplay video clip that differ from that applied during the original gameplay) can be determined based on activity that occurred within the actual gameplay (which can be determined from game state data). In some embodiments, the video parameter can be adjusted based on the type of activity that the player (e.g. the player's character) is engaged in during the gameplay. For example, in a first-person shooter game, when the player's character is not engaged in combat, then the view applied for the video clip may be zoomed out or shifted to a third-person view, whereas when the player's character is engaged in combat, then the view may be zoomed in or shifted to a first-person view. In another embodiment, the video parameters can be adjusted based on the presence of other objects of interest (e.g. other characters) in the vicinity of the player's character. For example, when other characters are in the vicinity of the player's character, it may be desirable to zoom out the view so as to show the other characters; whereas when there are not other characters in the vicinity of the player's character, then the view may be zoomed in or maintained as the same as that which was applied during the player's actual gameplay.

While embodiments have been described with reference to adjustment of video parameters, it will be appreciated that audio presented during the player's gameplay may also be adjusted or maintained for purposes of the gameplay video clip. For example, 3-D audio that is presented during gameplay may not be appropriate for the gameplay video clip. In one embodiment, the 3-D audio is converted to 2-D audio in an appropriate manner. For example, if the field of view provided in the video clip is smaller that which was originally presented to the player during gameplay, then the audio might be tailored to emphasize audio from the smaller field of view for the video clip. In another embodiment, the 3-D audio effect is maintained in the video clip. In still other embodiments, the 3-D audio is adjusted based on the changes which are made to the field of view/zoom, point of view, focus, depth of field, etc. For example, when the point of view is shifted, then the audio is presented from the shifted point of view rather than that which was originally presented to the player during the original gameplay. Similarly, if the field of view is expanded, then the audio may be adjusted to include or additionally emphasize audio from objects in the expanded field of view. In another example, if the focus is adjusted to a particular object, then audio from that particular object might be emphasized.

Though embodiments have been described with reference to sharing of gameplay video clips to a social network, it will be appreciated that a gameplay video clip can be shared, distributed, posted, or otherwise made available to a viewer in any context and on any type of device capable of supporting the playback of the video clip. By way of example, and not limitation, various contexts can include websites of any kind, dedicated applications, mobile device apps, streaming video players, gaming console interfaces, etc. Devices capable of presenting a video clip can include the following, without limitation: cell phones, PDA's, portable gaming devices, tablets, laptop computers, personal computers, televisions, projectors, HMD devices, smartwatches, etc.

Figure 10:
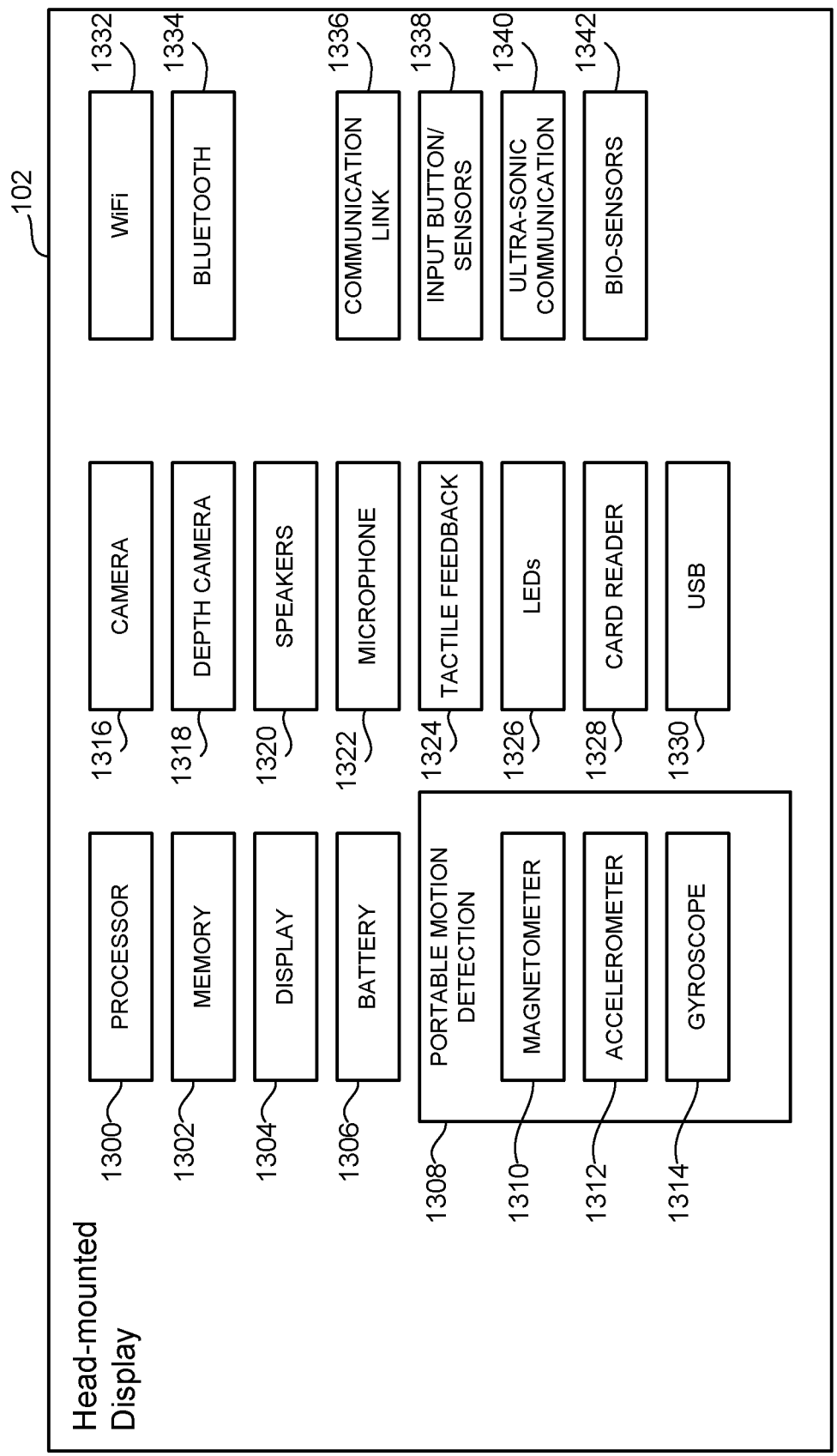
FIG. 10 illustrates components of a head-mounted display, in accordance with an embodiment of the invention.

With reference to FIG. 10, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 11:
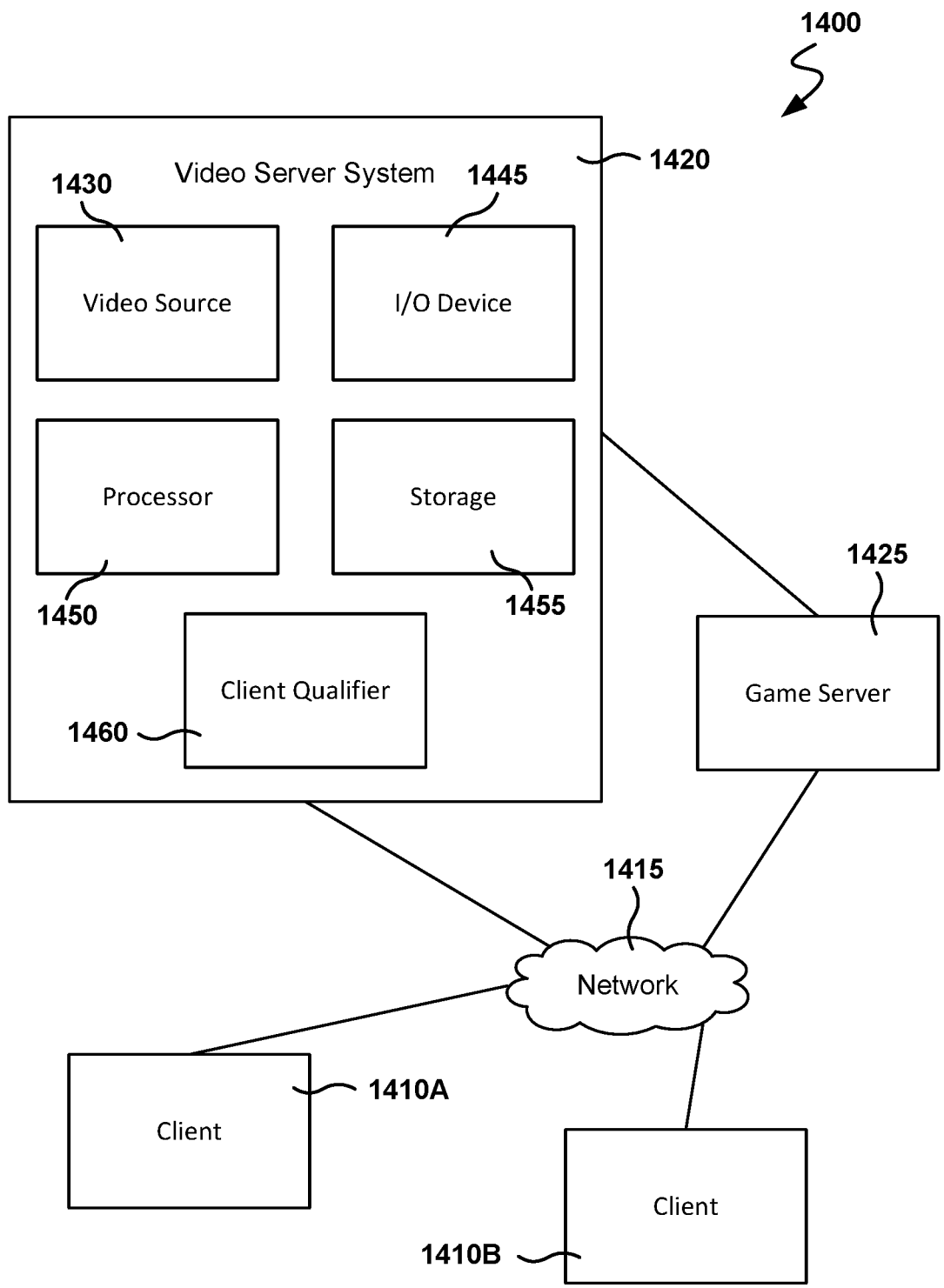
FIG. 11 is a block diagram of a Game System, according to various embodiments of the invention.

FIG. 11 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 1410, referred to herein individually as 1410A., 1410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sharing recorded content of an interactive application, comprising:
    recording, by at least one computer, a three-dimensional video clip to a storage, the three-dimensional video clip generated from a session of the interactive application that is viewed through a head-mounted display;
    receiving, by the at least one computer, a request to share the three-dimensional video clip over a social network;
    generating, by the at least one computer, a two-dimensional video clip by converting the three-dimensional video clip to a two-dimensional format, the two-dimensional video clip being configured for viewing through a two-dimensional display;
    sharing, by the at least one computer, the two-dimensional video clip over the social network.

2. The method of claim 1, wherein receiving the request to share the three-dimensional video clip is performed after the session of the interactive application is complete.

3. The method of claim 1, wherein receiving the request to share the three-dimensional video clip is performed when the session of the interactive application is paused.

4. The method of claim 1, wherein the three-dimensional video clip is recorded from a scene of the interactive application that is pre-identified for sharing over the social network.

5. The method of claim 1, wherein the three-dimensional video clip is an identified portion of recorded video of the session of the interactive application.

6. The method of claim 5, wherein the identified portion of recorded video is identified by analyzing application state data from the session of the interactive application.

7. A method for sharing recorded content of a video game, comprising:
    recording, by at least one computer, a three-dimensional video clip to a storage, the three-dimensional video clip generated from a session of the video game that is viewed through a head-mounted display;
    receiving, by the at least one computer, a request to share the three-dimensional video clip over a social network;
    transmitting the three-dimensional video from the at least one computer to a cloud gaming system;
    generating, by the cloud gaming system, a two-dimensional video clip by converting the three-dimensional video clip to a two-dimensional format, the two-dimensional video clip being configured for viewing through a two-dimensional display;
    sharing, by the cloud gaming system, the two-dimensional video clip over the social network.

8. The method of claim 7, wherein receiving the request to share the three-dimensional video clip is performed after the session of the video game is complete.

9. The method of claim 7, wherein receiving the request to share the three-dimensional video clip is performed when the session of the video game is paused.

10. The method of claim 7, wherein the three-dimensional video clip is recorded from a scene of the video game that is pre-identified for sharing over the social network.

11. The method of claim 7, wherein the three-dimensional video clip is an identified portion of recorded video of the session of the video game.

12. The method of claim 11, wherein the identified portion of recorded video is identified by analyzing application state data from the session of the video game.

13. A method for sharing recorded content of a video game, comprising:
    recording, by at least one computer, game state data from a session of the video game that is viewed through a head-mounted display;
    recording, by the at least one computer, three-dimensional video generated from the session of the video game;
    analyzing the game state data to identify one or more portions of the three-dimensional video;
    presenting, by the at least one computer, an interface for sharing of one or more of the identified portions of the three-dimensional video to a social network;
    receiving, by the at least one computer via the interface, a request to share a selected one of the identified portions of the three-dimensional video over the social network;
    generating, by the at least one computer, a two-dimensional video clip by converting the selected one of the identified portions of the three-dimensional video to a two-dimensional format, the two-dimensional video clip being configured for viewing through a two-dimensional display;
    sharing, by the at least one computer, the two-dimensional video clip over the social network.

14. The method of claim 13, wherein presenting the interface is performed after the session of the video game is complete.

15. The method of claim 13, wherein presenting the interface is performed when the session of the video game is paused.

16. The method of claim 13, wherein analyzing the game state data includes identifying significant events that occurred during the session of the video game, and wherein the identified portions of the three-dimensional video are determined based on the identified significant events.

17. The method of claim 13, wherein converting the selected one of the identified portions of the three-dimensional video to a two-dimensional format includes adjusting a field of view of the three-dimensional video for the two-dimensional format.

18. The method of claim 13, wherein the interface is further configured for trimming the identified portions of the three-dimensional video, and wherein receiving the request includes receiving input via the interface to trim the selected one of the identified portions of the three-dimensional video.

* * * * *